United States Patent [19]
Rich et al.

[11] 3,807,142
[45] Apr. 30, 1974

[54] METHOD AND APPARATUS FOR HIGH EFFICIENCY REMOVAL OF GASES AND PARTICLES FROM PAPER PULP SUSPENSIONS AND OTHER FLUIDS

[76] Inventors: Stanley R. Rich, 14 Dubiel Dr., Worcester, Mass. 01609;
Theophanes G. Pantazelos, 7 Cedar Street Pl., Somerville, Mass. 02143

[22] Filed: Sept. 27, 1971

[21] Appl. No.: 184,127

[52] U.S. Cl. .................................. 55/191, 55/204
[51] Int. Cl. .......................................... B01d 19/00
[58] Field of Search ......... 55/41, 52, 191, 204, 205; 209/211; 210/83, 512

[56] References Cited
UNITED STATES PATENTS

| | | | |
|---|---|---|---|
| 2,187,646 | 1/1940 | Darrieus | 55/205 X |
| 2,816,490 | 12/1957 | Boadway et al. | 55/191 X |
| 2,181,456 | 11/1939 | Johansson | 510/512 |
| 2,757,582 | 8/1956 | Freeman et al. | 55/191 X |
| 2,849,930 | 9/1958 | Freeman et al. | 55/52 |
| 3,432,036 | 3/1969 | Kaiser | 55/41 X |

FOREIGN PATENTS OR APPLICATIONS

| | | | |
|---|---|---|---|
| 595,744 | 4/1960 | Canada | 55/191 |

*Primary Examiner*—Samih N. Zaharna
*Assistant Examiner*—R. W. Burks
*Attorney, Agent, or Firm*—Alfred H. Rosen; Frank A. Steinhilper

[57] ABSTRACT

This disclosure depicts high efficiency apparatus and methods for separating and removing gases and particles from paper pulp suspensions and other fluids. The mixed fluid is introduced tangentially with high velocity at the periphery of a first vortical separation stage comprising an annular/axial space formed between a pair of modified-funnel-shaped elements, circular in horizontal section, and spaced apart axially the one within the other. The fluid has a rotating, inwardly spiralling trajectory between the modified-funnel-shaped elements and experiences centrifugal acceleration, causing centrifugal separation of gases and particles. The gases, and other components having lower density than the bulk of the liquid, are displaced inwardly toward the surface of the inner modified conical element. The higher density particles and components are centrifuged to the outer modified conical surface. Both, after separation, cannot remix with the main body of clarified liquid rotating within the modified conical annular/axial space.

The conical first stage vortical separator has high separational efficiency and can be utilized as a separator by itself for many applications. The overall separational efficiency is further increased by coupling the conical first stage of separation to a second cylindrical columnar separator stage by means of a transition section that suitably couples the first to the second stage.

The transition section, whose curvature is selected so as to avoid undesirable remixing of the separated gases and solids into the clarified liquid, connects the first separation stage with a cylindrical columnar second stage where additional separation occurs due to continued fluid rotation and wherein gases and other low density components are collected and removed at the axis thereof. The angle of taper of the second columnar separation stage can be selected so that this cylindrical column diverges away from the fluid entrance section, permitting withdrawal of gases without loss of liquid components. Heavier components and particles also are additionally separated in this second stage, collected, and removed near the outer surface of the cylinder. The clarified liquid collects and is removed from between these regions.

3 Claims, 6 Drawing Figures

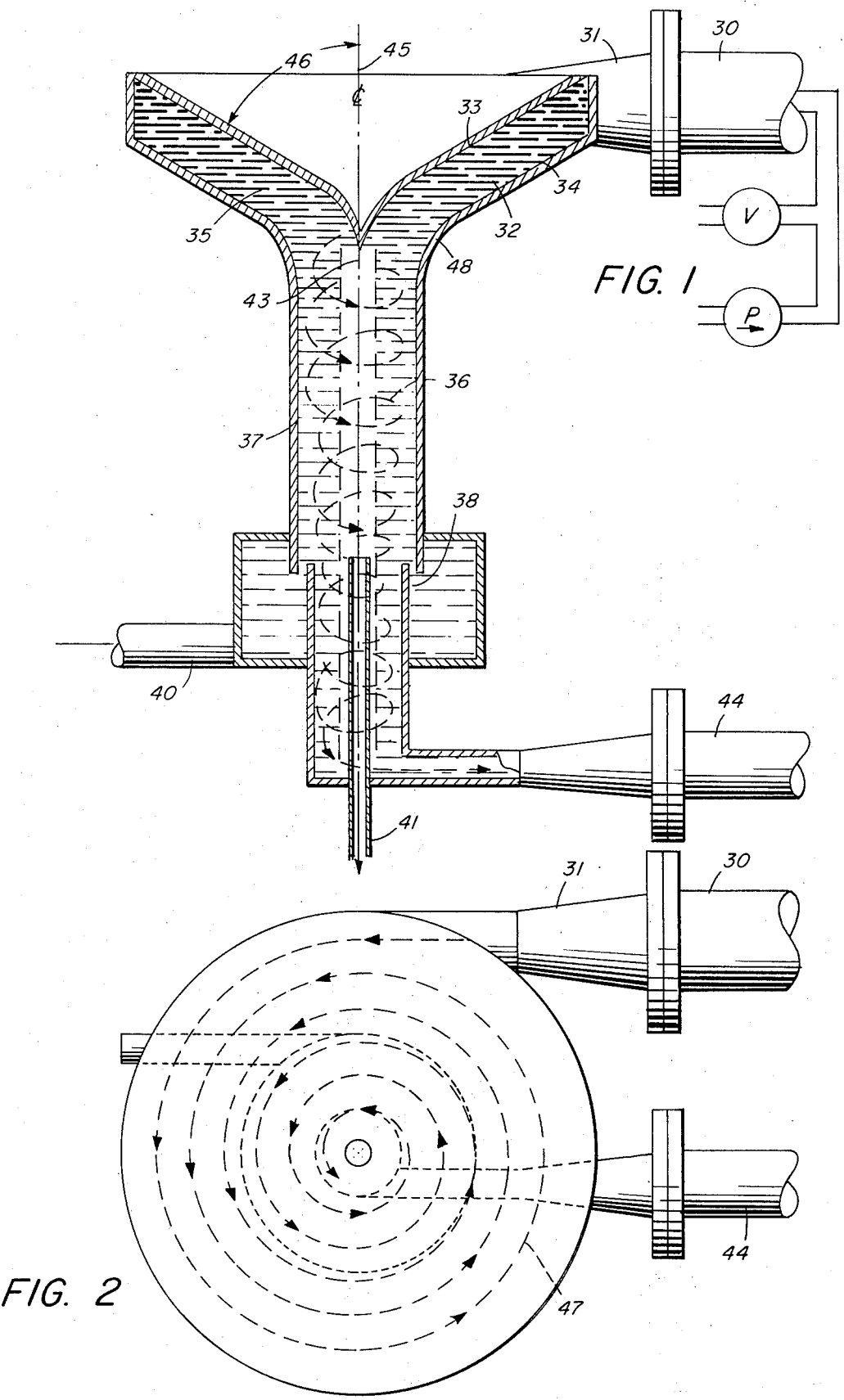

3,807,142

METHOD AND APPARATUS FOR HIGH EFFICIENCY REMOVAL OF GASES AND PARTICLES FROM PAPER PULP SUSPENSIONS AND OTHER FLUIDS

BACKGROUND OF THE INVENTION

Separators that make use of vortex motion of a fluid in order to separate gases and solid particles from a mixed fluid input are employed widely in a variety of industries. "Hydrocyclones" are employed in the paper industry to remove dirt from paper pulp suspensions. Such cyclones have been further developed to include removal of gases as well as heavy solid particles from paper pulp suspensions, but without complete success. Vortex principles are attractive because of their simplicity, but separation efficiency has been limited in prior art cyclones and vortex separators, resulting in limited applicability in numbers of industries. While, for example, U.S. Pat. No. 2,816,490 (Boadway et al.), U.S. Pat. No. 2,757,582 (Freeman et al), U.S. Pat. No. 2,849,930 (Freeman et al.) describe vortex separators for removing both gases and heavy particles from an input mixed fluid, such devices have found limited application. Instead, "hydrocyclones" are more frequently employed in the paper making industry only to remove dirt. For deaeration, vacuum tanks ("deculators") are added at considerable expense, to remove gases. Clearly, large vacuum vessels would not be employed if the prior art vortex separator devices were efficient in removing air and gas, as well as solids. In fact, recent U.S. Pat. No. 3,432,036 (H. G. Kaiser) shows a group of hydrocyclones arranged to discharge into a large vacuum tank ("deculator") in order more efficiently to remove air and gas from paper pulp suspensions.

These prior art devices have failed to recognize or appreciate a number of fundamental principles which are exploited by the present invention and without which high efficiencies of separation of both lighter and heavier components, including gases and heavy dirt particles are not attainable.

The present invention, for the first time, provides a two stage separation system, thereby adding the necessary additional separation efficiency required in numbers of separation applications where prior art single stage separators have not developed adequate separational efficiency. As a result, separators constructed according to the present invention are applicable widely in the pulp and paper industry to remove simultaneously both dirt as well as dissolved and entrained air and gases with high efficiency and low cost. In addition, the present invention is applicable to the stripping or removal of entrained and dissolved gases found in both the chemical and petroleum industries. Monomer gases are stripped readily and at low cost by devices constructed according to the present invention. Entrained and dissolved air is removed efficiently from boiler feed water. Solids are readily removed from coolant fluids employed in the machine tool industry.

OBJECTS OF THE INVENTION

It is an object of this invention to provide substantially improved vortex gas-liquid-solid separation apparatus and methods.

It is another object of the invention to provide vortex separation apparatus and methods having such high efficiencies as to make possible the provision of commercially competitive vortex separators for application as gas and monomer strippers, coolant clarifiers, effluent purifiers, as well as paper pulp stock cleaners and deaerators, and the like.

It is a further object of this invention to provide clarifiers and separators of high separational efficiency to replace and compete with centrifugal devices having expensive moving parts, including centrifuges, cream separators, etc.

Further objects and advantages of the invention will in part be obvious and will in part become apparent as the following description proceeds. The features of novelty which characterize the invention will be pointed out with particularity in the claims annexed to and forming a part of this specification.

BRIEF DESCRIPTION OF THE DRAWINGS

For a fuller understanding of the invention, reference may be had to the following detailed description taken in connection with the accompanying drawings wherein:

FIG. 1 is a sectional view of a preferred embodiment of the invention:

FIG. 2 is a top view of the apparatus of FIG. 1:

DESCRIPTION OF THE PREFERRED EMBODIMENTS

Figure 3:
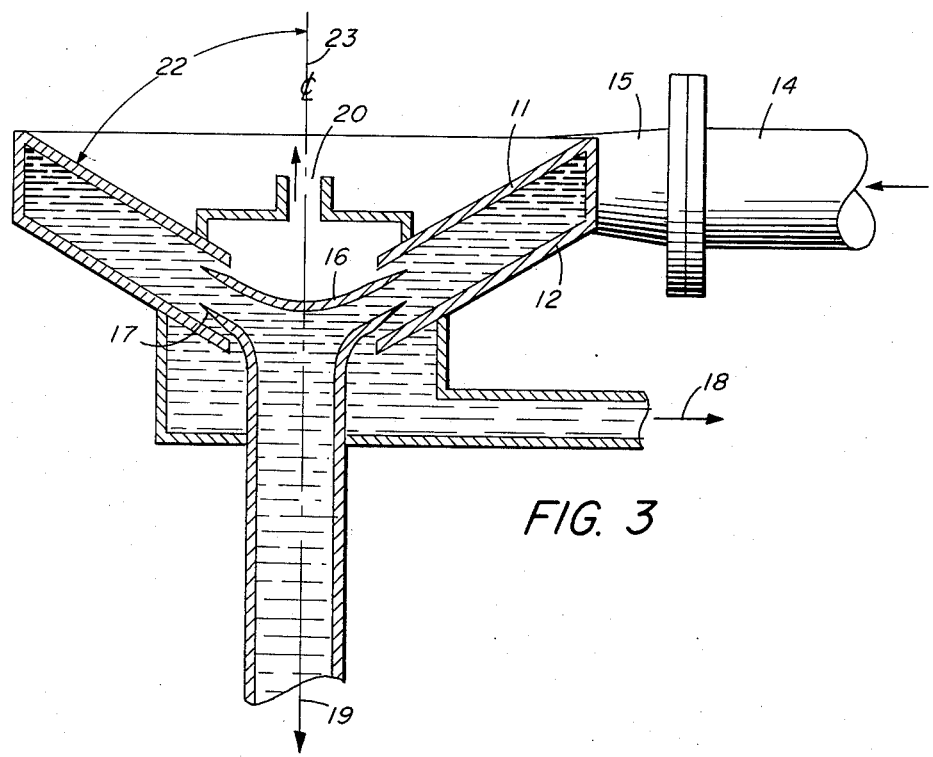
FIG. 3 is a sectional view of a second preferred embodiment of the invention.

This invention involves the recognition and full realization of a number of principles applicable to vortex gas/liquid/solid separators which were either totally unknown or not fully appreciated by the prior art. The exploitation of these principles has enabled us to provide a vortex separator with separational efficiencies far exceeding those achievable with any known prior art device.

A first principle of great importance involves the creation of an entirely novel vortical first separation stage comprising an annular/axial space formed between a pair of modified funnel-shaped elements, circular in horizontal section and spaced apart axially the one within the other. The fluid to be separated is introduced into the periphery between the elements in a tangential direction and it travels thereafter in a rotating, inwardly spiralling trajectory between the modified funnel-shaped elements, experiencing centrifugal acceleration, causing centrifugal separation of gases and heavy particles. The gases, and other components having lower density than the bulk of the liquid, are centrifugally displaced inwardly toward the surface of the inner modified conical element. The higher density particles and components are centrifuged to the outer modified conical surface. Both, after separation, cannot remix with the main body of clarified liquid rotating within the modified conical annular/axial space. All components of the material that are separated from the mixed fluid input, travel in the same direction as the fluid -- moving toward the central axis of the system. This is in contradistinction to the prior art, as exemplified by U.S. Pat No. 2,181,456 - I. E. Johansson, in which the mixed fluid is introduced near the center of the system and, in which, the heavier particles settle by gravity at the center of the system, while the clarified liquid is taken off at the periphery. The prior art, as exemplified by Johansson, never did appreciate the fact that a high velocity input of fluid, introduced tangentially at the periphery of a pair of essentially parallel cone-shaped elements, will both be separated and will enjoy concurrent movement of the clarified liquid as well as both the lighter and heavier elements of this fluid, all material moving toward the center of the system yet remaining separated. The lighter and the heavier elements separated from the input mixed fluid are easily removed by doctor knife sections, if desired, while the clarified liquid is allowed to pass out of the system through a central opening. This novel form of vortex separator has demonstrated great efficiency, particularly for degassing and deaeration, in view of the short path required for gas to reach the inner conical surface. In this regard, the new form of separator has separational efficiency greater than conventional hydro-cyclones, etc.

It is a second principle of our invention that our conical form of vortex separator is utilized as the first separation stage of a two-stage separation system, yielding still higher efficiencies of separation, when required. In this case, the first or conical vortex separation stage acts in conjunction with a second columnar cylindrical vortex separation stage by means of a transitional coupling section, having specific and critical design.

It is an additional feature of this portion of our invention that the components separated in the first stage from the mixed fluid input, remain separated without remixing so that additional separation is performed in the second stage, with resulting separational efficiency of the total exceeding any single-stage vortex type separator of which the inventors are aware in any of the prior art.

The two-stage form of our invention utilizes a columnar cylindrical vortex separator for its second stage of separation. Due to the use of the novel conical first-stage, high separational efficiency is obtained before the liquid enters the second or cylindrical columnar stage of the separation system. Prior art cyclone and vortex separators do not incorporate this novel feature. In fact, in all known prior art devices, the mixed fluid is itself introduced without separation into the cylindrical column that characterizes most of the known prior art systems.

Where the fluid input to a columnar separator or cyclone is not located directly at the cylinder wall, such as in U.S. Pat. No. 2,816,490 - Boadway et al, there is no appreciation that the use of funnel-shaped elements such as those incorporated in the present invention, could provide a first stage of separation, thereby to greatly increase the efficiency of the system. In U.S. Pat. No. 2,816,490, there is a disc-shaped entrance space or chamber, designated as chamber No. 42 in FIG. 3, incorporated so that (column 4, lines 64 to 67) "the pressure energy is still further converted into velocity energy as the liquid or mixture enters the upper end of the elongated separation chamber 43 of circular cross-section." In contradistinction, the first stage of the present invention serves both as an efficient first separation stage as well as a means of increasing the angular velocity of the fluid.

A third principle, also of great importance, involves the provision of a novel transition section between the first separation stage and the second columnar cylindrical separation stage. The transition from inwardly spiralling vortex movement in the first separation stage to helically rotating vortex movement in the cylindrical columnar second separation stage involves "turning a corner." All of the fluid components are required to change direction in such a manner that a component of centrifugal acceleration is caused to generate separation forces "in the wrong direction." It is only by making use of this third principle, not to be found anywhere in the prior art, that the separated components are forced to remain separated while making the transition from essentially spiral to essentially helical vortex movement. Only in this manner can both the first and second separation stages function additively to increase the efficiency of the invention.

The second separation stage of our invention comprises a columnar cylinder, in which fluid motion is essentially helical. Where it is important to remove entrained and dissolved gases from the incoming fluid, this column can be made to increase in diameter as it proceeds away from the transition section, where fluid enters, having been pre-separated in the first separation stage. By diverging, the gaseous core at the center of the rotating column is made to increase in diameter. A tube, connected to a suction or vacuum apparatus can then draw off the gases separated by the invention, without contacting the rotating fluid in any way, both reducing fluid friction and insuring that no liquid is removed by the vacuum or suction apparatus. This latter concept is itself novel and has contributed substantially to the utility of the invention as a deaeration device and also in the removal of gases, as in monomer stripping and in the elimination of toxic dissolved gases, including hydrogen cyanide.

On the other hand, it is within the scope of our invention to provide a second cylindrical separation stage in which the cylinder tapers either inwardly or remains a straight right circular cylinder, as required by the specific applications for which the devices are constructed. Two-stage separators, constructed in accordance with our invention, can accomodate second stages which have angles of taper that can range from positive to negative angles of taper, including no taper at all.

These three principles as well as other novel features and concepts are implemented in structures described in more detail hereinafter.

FIGS. 1 and 2 illustrate a preferred one of the many possible embodiments of the principles of this invention. Fluid to be separated enters the nozzle 30 under pressure. We have found that the pressure required usually lies between 10 and 100 pounds per square inch. This pressure is normally provided by a pump P which is schematically illustrated. The pump is preferably so selected that the fluid mixture is introduced into the separator with a pressure rise contributed by the pump substantially equal to the pressure drop through the separator. In this way, the separator, plus the pump, comprising a complete separator, will have essentially zero net pressure drop from input to output. Such a complete separator can then be introduced into an existing fluid installation, such as in papermaking, without disturbing flow or pressure conditions. In some practical applications where a fluid flow rate may vary from time to time, it is desirable to adjust pump conditions, such as rotation speed, by-pass or relief valve V, etc., so that the pressure rise furnished by the pump will always be essentially equal to the pressure drop through the separator, resulting in substantially zero net pressure drop regardless of flow rate.

Constriction 31 transforms the potential or pressure energy of the fluid into velocity energy, causing the fluid to issue from constricting nozzle 31 at high velocity. The fluid enters tangentially at the periphery of space 32, shown between modified funnel-shaped surfaces of revolution 33 and 34. The fluid then takes an inwardly curving spiral path toward the center-line axis 45 of the system. As the fluid spirals inwardly, as shown in the dotted lines 47, gases and other low density components are displaced inwardly toward the inner surface of conical member 33. High density components, including dirt particles, sludge, etc., are centrifuged outwardly to the inner surface of the conical member 34. The clarified liquid 32 continues to spiral inwardly between the inner surfaces of conical members 33 and 34. Gases and other lighter density components, spiralling toward the central line 45 along the inner surface of conical member 33, never again remix with the clarified liquid. Heavier components, spiralling inwardly toward center line 45, along the inner surface of conical member 34, also do not remix with the clarified liquid 32. Thus, there exist three separated portions of the original mixed fluid, each of them spiralling in its own layer toward the center of the system.

It is clear that the angle 46 must be less than 90° so that the separated components will form distinct layers and to prevent mixing of the components. Practically speaking, we have found that angles between 30° and 85° satisfy this criterion.

In the manner described above, the space between the conical elements 33 and 34 comprises a first-stage vortical separator, capable of receiving a mixed fluid travelling at high speed tangentially at the periphery thereof, and separating lighter and heavier elements from the mixed fluid, maintaining the three separated components in discrete layers. The now separated fluid components continue their spiral motions inward through transition section 35, to be described in greater detail below. The curvature 48 of this transition section 35, is chosen so that there is no remixing or scrambling of the fluid components during the transition from essentially spiral inward motion in the first separator section 32 to essentially helical motion in the second cylindrical columnar separator section 36.

In the second stage of separation 36, all components of the original fluid execute helical vortex motion as they proceed in a downward direction as shown in FIG. 1 toward their respective exit points: 44 for the clarified liquid, 40 for the solids and heavier components, and 41 for the gaseous and lighter componwnts. Additional separation takes place in the helical vortex, in which heavier particles are thrown to the inner surface of the wall 37, while gases and other lighter components are displaced inwardly toward the central gas core 43. An annular doctor knife section 38 skims off the solids and other heavier components, which exit from the two-stage separator at 40. Tube 41 is connected to a suitable vacuum or suction source to remove gases and vapors that have been separated in either or both of the separation stages of the invention. The clarified liquid exits from the separator as shown at 44.

Figure 4:
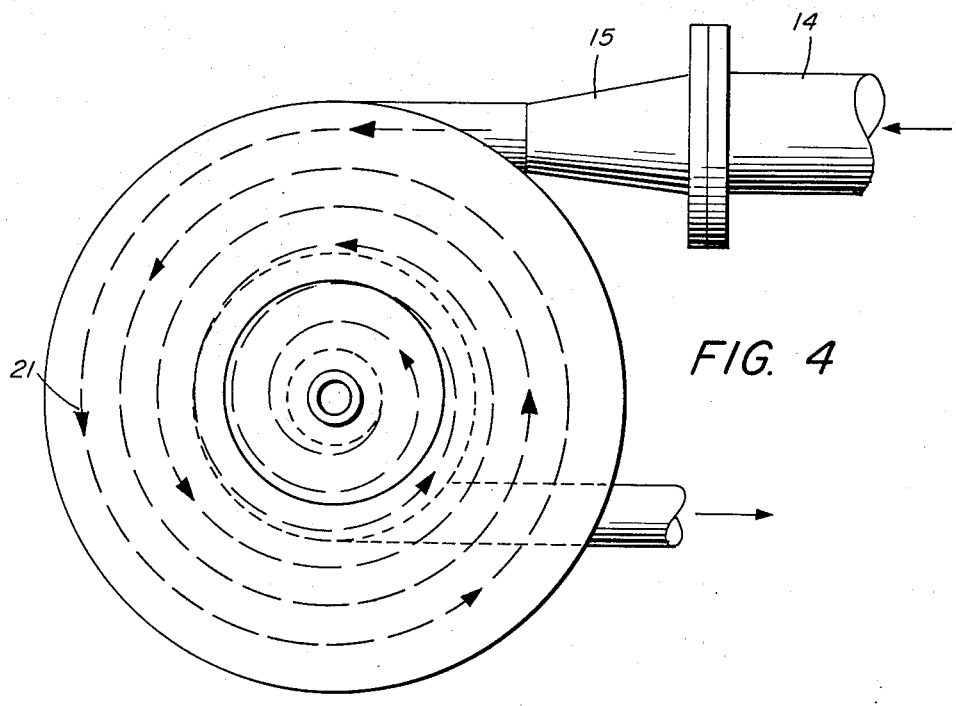
FIG. 4 is a top view of the apparatus of FIG. 3.

FIGS. 3 and 4 show the first stage of the present invention employed by itself as a vortex gas/liquid/solid separator. In accordance with our invention, such a configuration can be employed where the additional efficiency of an added second stage is not required. Here, mixed fluid enters the system under pressure into the entrance nozzle 14. The pressure is usually supplied by a pump which is not shown. The pump is so selected that the fluid mixture is introduced into the separator with a pressure rise contributed by the pump substantially equal to the pressure drop through the separator, resulting in essentially zero net pressure drop from input to the pump to output of the separator under the flow conditions that exist in a given application. Where flow conditions may vary from time to time, it may be desirable to adjust pump speed or valving arrangements so that the net pressure drop across the pump and separator remains substantially constant or zero.

Constriction 15 converts most of the pressure energy to velocity energy causing the liquid to execute an inwardly spiralling trajectory 21. Gases and other light components are displaced inwardly to the inner surface of the conical member 11. Dirt, solids, and other heavy components are centrifuged outwardly to the inner surface of conical member 12. All three separated components:- gases and other light portions, clarified liquid, and solids and other heavy components, continue in their separate but parallel inwardly spiralling trajectories toward the center line of the system 23.

We have found that angle 22 may be chosen between practical limits of 40° and 85°, defining the degree of angularity of conical members 11 and 12. It is clear that gases and other lighter components will migrate quickly toward surface 11 and will be maintained in an inwardly spiralling trajectory along the inner surface of member 11, never remixing with the clarified liquid which spirals inwardly between the inner surfaces 11 and 12. In like manner, solids and other heavy particles will continue to spiral inwardly along the inner surface of member 12. Thus, as the fluid approaches the center line, it is separated and stratified into lighter components along the inner surface of 11, clarified liquid at the center of the space between the inner surfaces of 11 and 12, and heavier components, including solids, along the inner surface of number 12.

Gases and other light components are picked off by the doctor knife 16, which skims these components for exit at 20 to a vacuum or suction line, for their removal from the main stream. Clarified liquid is shown leaving the separator at 19. In a similar manner, annular doctor knife 17 skims the solids and other heavy components for exit from the system at 18.

It is understood that this portion of our invention may be used as described above by itself alone, although intended essentially as the first stage of a two-stage separator as shown in FIGS. 1 and 2.

Figure 6:
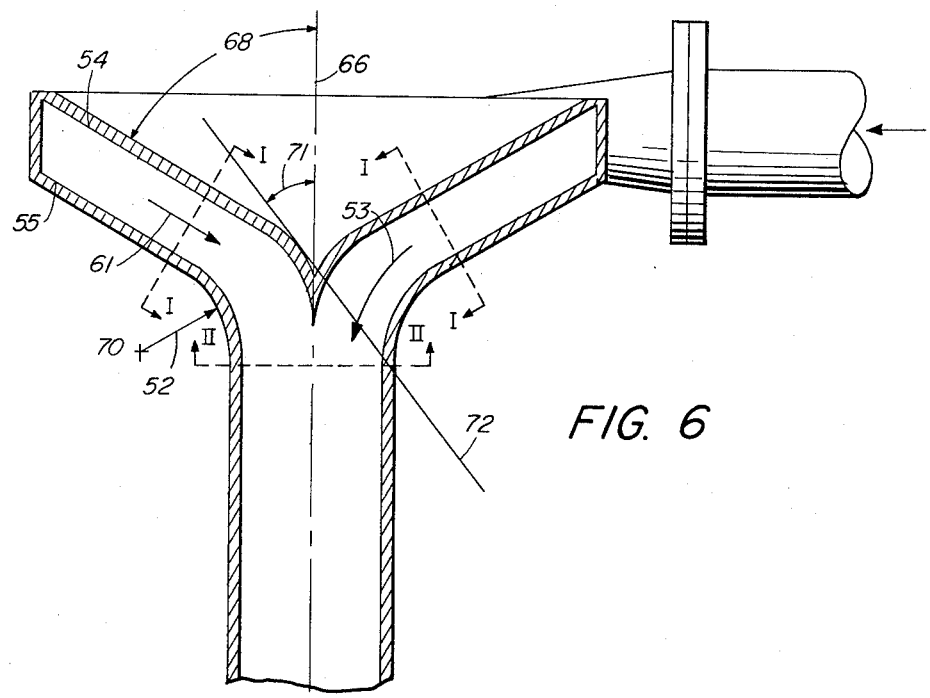
FIG. 6 is a bottom view of the apparatus shown in FIG. 5.
Figure 5:
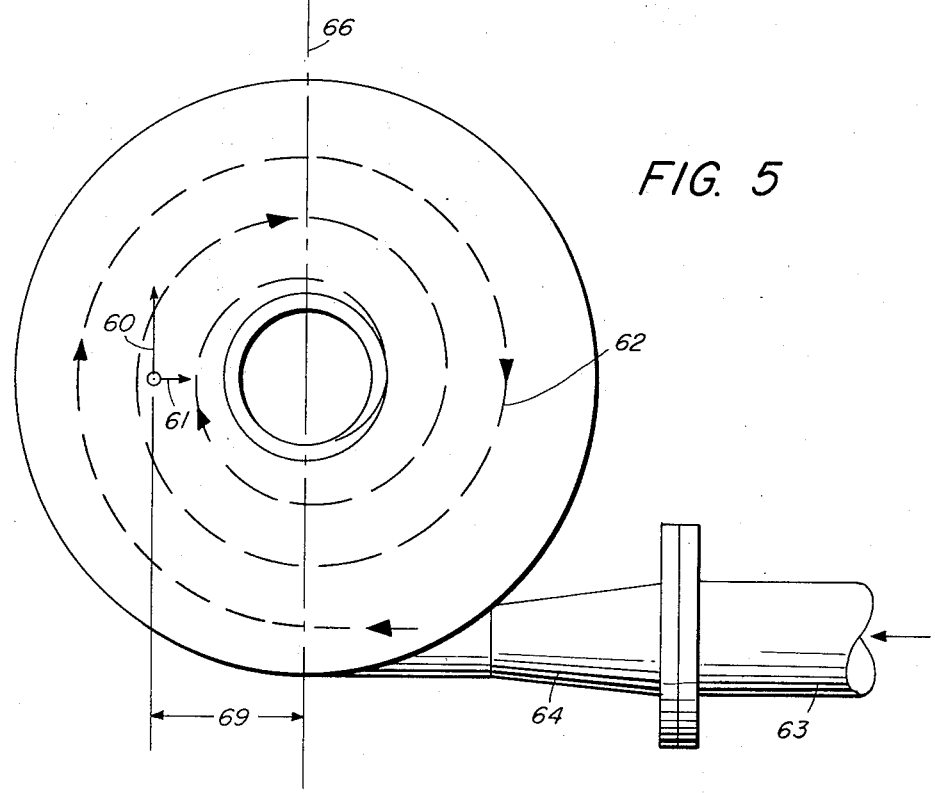
FIG. 5 is a partial sectional view of the apparatus of FIG. 1.

FIGS. 5 and 6 illustrate the principles as well as the design of the transition section that connects stage 1 with stage 2 of the two stage separator version of the present invention. FIG. 5 shows mixed fluid input into entrance system 63. Constricting nozzle 64 transforms the pressure energy of the fluid into velocity or kinetic energy. The fluid is supplied to the separator under pressure by a centrifugal pump, or the like, well known in the prior art and not shown in the figure. The fluid takes the spiral path 62 as shown in FIG. 5, travelling inwardly from the periphery toward the center line 66.

As it spirals toward the center, gaseous components are separated from the mixed fluid and form an inwardly spiralling layer along the conical member 54. Solids and other heavy components are separated and form an inwardly spiralling layer along the inner surface of conical member 55. The critical transition portion of the two-stage separator lies between dotted lines I - I and dotted lines II - II shown in FIG. 6.

The motion of the inwardly spiralling fluid can be divided into two components:- a circumferential velocity component shown as velocity vector 60 in FIG. 5 and a velocity component shown as vector 61 in FIGS. 5 and 6, at a right angle to vector 60 and directed toward the system centerline 66. Velocity component 61 is taken parallel to the radial elements of conical numbers 54 and 55, as shown in FIG. 6.

Velocity component 61 is the fluid throughput velocity. The circumferential velocity component 60 does not contribute to fluid flow through the separator system, since it is always orthogonal to the actual fluid throughput. The circumferential velocity component 60 is created by the tangential direction given the fluid at the peripheral input to the conical separator stage. Essentially, it is brought into existence in order to produce centrifugal separation of gases and also solids from the input mixed fluid.

The throughput velocity component 61 does not contribute to fluid separation in either the first or second stages of our invention. However, in the transition section between these stages, the actual fluid throughput in the first stage of separation runs toward the central axis of the system 66, along lines parallel to the radial elements of the conical members 54 and 55. In the second stage of separation of fluid throughput runs parallel to the central axis 66.

To effect this change in direction, the fluid throughput must turn through an angle equal to angle 68 shown in FIG. 6. When the fluid passes through transition section 53, it turns through an angle equal to angle 68 in FIG. 6. As it does so, a component of centrifugal acceleration comes into existence directed away from the center of curvature 70 of the transition section - and toward the central axis 66, of the system. This component of centrifugal acceleration tends to throw heavier particles and higher density fluid components toward central axis 66, while it tends to cause gases and lighter density fluid components to be displaced away from said axis. In other words, the throughput velocity acts in the transition section of the 2 stage version of our invention to tend to remix the fluid components that were separated in the first, or conical stage of separation. It is necessary, therefore, so to design the transition section 53 that actual remixing cannot take place. This has been accomplished and the necessary design criteria are discussed below.

It is possible to describe the centrifugal acceleration produced by the throughput velocity component 61 of the fluid, during passage through the transition section 53 of our invention, as the undesired, or anti-separation centrifugal acceleration.

This acceleration $$A_v = V_t^2/r_t g \qquad 1,$$

where $A_v$ is the anti-separation acceleration in g's (gravitation constant units), $V_t$ is the throughput component velocity, $r_t$ is the radius of curvature at any given point in the transition section 53, and $g$ is the gravitational acceleration constant.

$V_t$ is defined by the expression $$V_t = Q/A \qquad 2,$$

at all times where:

$Q$ is the volume of fluid flow, and $A$ is the cross-sectional area through which the fluid passes at the point where $V_t$ is being defined.

The desired, or separational centrifugal acceleration at any point in the separation system $$A_s = V_c^2/r \, g \qquad 3,$$

where $A_s$ is the separational, or desired centrifugal acceleration in g's (gravitation constant units), $V_c$ is the circumferential velocity 60 at a given point, and $r$ is the radius 69 to the central axis 66.

In the transition section 53, the net centrifugal acceleration at a given point with respect to the central axis 66 is:

$$A_n = A_s - \beta A_v, \qquad 4,$$

where $A_n$ is the net centrifugal acceleration with respect to central axis 66, $A_s$ is defined in Equation 1, above, $A_v$ is defined in Equation 3, above, and $\beta$ is the sine of angle 71, the angle made by the tangent 72, at a given point in the transition section, to central axis 66.

When $A_n$ is positive, the desired separational centrifugal acceleration $A_s$ is greater than the undesired centrifugal acceleration, $A_v$. This is a necessary condition in order to prevent upsetting of the separation that occurs in the first, or conical stage of separation in the present invention. This criterion can be expressed $$V_c^2/r > \beta \, V_t^2/r_t \qquad 5.$$

From a practical viewpoint, it is best to have $$A_s > 2A_v \qquad 6,$$

at all times. We have found that by making radius of curvature 52 at least twice as large as radius 69, at any point, we insure that there is an adequate margin of safety in preventing any remixing of fluid components. On the other hand, we have found that too small a radius of curvature 52, such as occurs when the transition is a sharp corner, does indeed result in violent remixing of fluid components.

Using a two stage separator constructed in accordance with the principles of the present invention, we have succeeded in effecting the complete deaeration of a paper pulp suspension without requiring a vacuum tank following the deaeration in our separator. A paper pulp suspension of ½ percent consistency, deliberately aerated by beating with air in a Waring type blender, was pumped through our two-stage separator, as shown in FIG. 1. After passage therethrough, the paper pulp sank toward the bottom of a receiving vessel within 30 seconds after treatment in the separator, indicating substantially complete deaeration. In a sample taken from the input aerated suspension, the paper pulp rose to the surface of the sample almost immediately. Further tests of the treated suspension showed that the air content of the treated output from the separator did not contain any measurable quantity of entrained or suspended air or gas.

Passage of highly aerated hot water through the separator of FIG. 1 also resulted in complete deaeration. Similar results were obtained with water charged with ammonia gas, in which cases the ammonia level in the separator output was less than 1/10 percent of that measured in the input.

Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed is:

1. Apparatus for separating the components of a fluid mixture containing same, which comprise a pair of cone shaped elements disposed the one within the other in spaced relationship so as to form a conical chamber between them, inlet means for introducing the mixture tangentially under pressure in the vicinity of the periphery of said chamber to form an inwardly spiralling vortex therein, said conical chamber being shaped to assure that a net outwardly directed centrifugal force will exist at all points therein on said mixture flowing therein, whereby the resulting centrifugal acceleration separates the fluid mixture into its components, at least one substantially annular doctor knife located in the portion of said chamber approaching said apex for physically separating at least two components of said mixture, and outlet means located in the vicinity of the apex of the conical chamber to receive said separated components.

2. Apparatus in accordance with claim 1 in which said inlet means includes a pump so selected that the fluid mixture is introduced into said separator with a pressure rise contributed by said pump substantially equal to the pressure drop in said separator.

3. Apparatus in accordance with claim 2 in which means are provided to adjust the pressure rise contributed by said pump to substantially equal the pressure drop through said separator under varying fluid flow conditions.

* * * * *